(12) United States Patent
Wholey, III et al.

(10) Patent No.: US 7,870,556 B2
(45) Date of Patent: Jan. 11, 2011

(54) MANAGING COMPUTING RESOURCES IN GRAPH-BASED COMPUTATIONS

(75) Inventors: Joseph Skeffington Wholey, III, Belmont, MA (US); Igor Sherb, Natick, MA (US); Ephraim Meriwether Vishniac, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 160 days.

(21) Appl. No.: 11/434,623

(22) Filed: May 16, 2006

(65) Prior Publication Data

US 2007/0271381 A1 Nov. 22, 2007

(51) Int. Cl.
*G06F 9/46* (2006.01)
*G06F 15/173* (2006.01)
(52) U.S. Cl. .................................. 718/104; 709/226
(58) Field of Classification Search .................. 718/104; 709/238
See application file for complete search history.

(56) References Cited

U.S. PATENT DOCUMENTS

| | | | |
|---|---|---|---|
| 4,491,909 A * | 1/1985 | Shimizu | 711/147 |
| 4,972,314 A | 11/1990 | Getzinger et al. | |
| 5,896,511 A * | 4/1999 | Manning et al. | 709/232 |
| 5,933,640 A | 8/1999 | Dion | |
| 5,966,072 A | 10/1999 | Stanfill et al. | |
| 5,999,729 A | 12/1999 | Tabloski, Jr. et al. | |
| 6,088,716 A | 7/2000 | Stanfill et al. | |
| 6,101,599 A * | 8/2000 | Wright et al. | 712/228 |
| 6,330,008 B1 | 12/2001 | Razdow et al. | |
| 6,437,796 B2 | 8/2002 | Sowizral et al. | |
| 6,449,711 B1 | 9/2002 | Week | |
| 6,480,876 B2 | 11/2002 | Rehg et al. | |
| 6,584,581 B1 | 6/2003 | Bay et al. | |
| 6,608,628 B1 | 8/2003 | Ross et al. | |
| 6,611,682 B1 | 8/2003 | Reisman | |
| 6,654,907 B2 | 11/2003 | Stanfill et al. | |
| 6,658,464 B2 | 12/2003 | Reisman | |
| 6,813,761 B1 | 11/2004 | Das et al. | |
| 6,848,100 B1 | 1/2005 | Wu et al. | |
| 7,028,088 B1 * | 4/2006 | Koperda et al. | 709/229 |
| 7,167,850 B2 | 1/2007 | Stanfill | |
| 7,171,535 B2 * | 1/2007 | Naoi | 711/169 |
| 2001/0055019 A1 | 12/2001 | Sowizral et al. | |
| 2002/0080181 A1 | 6/2002 | Razdow et al. | |
| 2002/0091747 A1 | 7/2002 | Rehg et al. | |

(Continued)

OTHER PUBLICATIONS

Ou et al., "Architecture-Independent Locality-Improving Transformations of Computational Graphs Embedded in k-Dimensions", Proceedings of the 9th Intl Conf on Supercomputing, 1995.

(Continued)

*Primary Examiner*—Emerson C Puente
*Assistant Examiner*—Camquy Truong
(74) *Attorney, Agent, or Firm*—Fish & Richardson P.C.

(57) ABSTRACT

Executing graph-based computations includes: accepting a specification of a computation graph in which data processing elements are joined by linking elements; dividing the data processing elements into sets, at least one of the sets including multiple of the data processing elements; assigning to each set a different computing resource; and processing data according to the computation graph, including performing computations corresponding to the data processing elements using the assigned computing resources.

75 Claims, 4 Drawing Sheets

U.S. PATENT DOCUMENTS

2002/0091748 A1  7/2002  Rehg et al.
2002/0129340 A1* 9/2002  Tuttle .......................... 717/132
2002/0184616 A1  12/2002 Chessell et al.
2005/0267988 A1* 12/2005 Lisitsa et al. ................. 709/238

OTHER PUBLICATIONS

Cytron et al., "Efficiently Computing Static Single Assignment Form and the Control Dependence Graph", ACM Transactions of Programming Languages and Systems, vol. 13, No. 4, Oct. 1991.

Martin et al., "Models of computations and Systems-Evaluation of Vertex Probabilities in Graph Models of Computations", Journal of the Association for Computing Machinery, vol. 14, No. 2, Apr. 1967.

Baer et al., "Legality and Other Properties of Graph Models of Computations", Journal of the Association for Computing Machinery, vol. 17, No. 3, Jul. 1970.

Stanfill, "The Marriage of Parallel Computing and Information Retrieval", IEE Colloquium on Parallel Techniques for Information Retrieval, Apr. 1989.

Stantfill, "Massively Paralle Information Retrieval for Wide Area Information Servers", 1991 IEEE International Conference on Systems, Man and Cybernetics, Oct. 1991.

Wah et al., "Report on Workshop on High Performance Computing and Communications for Grand Challenge Applications", IEE Transactions on Knowledge and Data Engineering, Feb. 1993.

Li et al., "A Practical External Sort for Shared Disk MPPs", Proceedings of Supercomputing '93, 1993.

Stanfill et al., "Parallel Free-Text Search on the Connection Machine System", Communications of the ACM, vol. 29, No. 12, Dec. 1996.

Bookstein et al., "Modeling Word Occurences for the Compression of Concordances", ACM Transactions on Information Systems, vol. 15, No. 3, Jul. 1997.

* cited by examiner

MANAGING COMPUTING RESOURCES IN GRAPH-BASED COMPUTATIONS

BACKGROUND

The invention relates to managing computing resources in graph-based computations.

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. One approach to executing a graph-based computation is to execute a number of processes, each associated with a different vertex of the graph, and to establish communication paths between the processes according to the links of the graph. For example, the communication paths can use named pipes, TCP/IP or UNIX domain sockets, or shared memory to pass data between the processes.

SUMMARY

In one aspect, in general, the invention features a method for executing graph-based computations. The method includes: accepting a specification of a computation graph in which data processing elements are joined by linking elements; dividing the data processing elements into sets, at least one of the sets including multiple of the data processing elements; assigning to each set a different computing resource; and processing data according to the computation graph, including performing computations corresponding to the data processing elements using the assigned computing resources.

In another aspect, in general, the invention features a computer program, stored on a computer-readable medium, for executing graph-based computations. The computer program includes instructions for causing a computer system to: accept a specification of a computation graph in which data processing elements are joined by linking elements; divide the data processing elements into sets, at least one of the sets including multiple of the data processing elements; assign to each set a different computing resource; and process data according to the computation graph, including performing computations corresponding to the data processing elements using the assigned computing resources.

In another aspect, in general, the invention features a system for executing graph-based computations. The system includes a pre-execution module including circuitry to accept a specification of a computation graph in which data processing elements are joined by linking elements, and divide the data processing elements into sets, at least one of the sets including multiple of the data processing elements. The system includes an execution module including circuitry to assign to each set a different computing resource, and process data according to the computation graph, including performing computations corresponding to the data processing elements using the assigned computing resources.

Aspects of the invention can include one or more of the following features.

At least one computing resource assigned to a set includes a process.

Each of the linking elements is associated with a data flow from an output of an upstream data processing element to an input of a downstream data processing element Processing the data includes, for at least one of the sets performing computations corresponding to the data processing elements in the set according to a sequence defined by linking elements joining the data processing elements in the set.

A computing resource assigned to a set passes work elements associated with a data flow from an output of an upstream data processing element to an input of a downstream data processing element in the same set as the upstream data processing element by calling a function associated with the downstream data processing element.

The function reads the work elements from a storage location in which the work elements were written by a function associated with the upstream data processing element.

The function associated with the upstream data processing element and the function associated with the downstream data processing element are invoked by the same process.

Processing data further includes maintaining information characterizing respective quantities of activity associated with the individual data processing elements in each set.

The respective quantities of activity include quantities of data processed according to the respective data processing elements.

The respective quantities of activity include amounts of time spent by a computing resource assigned to a set performing computations corresponding to the respective data processing elements.

The data processing elements in a set form a connected directed subgraph of the computation graph.

The subgraph includes a tree.

For each data processing element in a set that has multiple inputs, all of the upstream data processing elements linked to the inputs of that data processing element are also in the set.

In response to receiving a control message for a data processing element in the subgraph that does not have an upstream element in the subgraph, functions associated with each of the other data processing elements in the subgraph are called to save state information for each data processing element in the subgraph in non-volatile storage before propagating the control message outside of the subgraph.

The state information for each of the data processing elements in the subgraph is saved in a single file.

The data processing elements have a specified degree of parallelism.

Each of the data processing elements in a set have the same degree of parallelism.

The specification of the computation graph indicates a phase of execution associated with each of the data processing elements.

Each of the data processing elements in a set are associated with the same phase of execution.

Aspects of the invention can include one or more of the following advantages.

Expressing data processing applications as data flow computation graphs aids a developer in the process of building the application and understanding and analyzing the computations involved. The computations are performed in a host operating system by processes. Each process is associated with computing resources such as processing time and memory. Due to overhead associated with each process, overall computing resources used by a computing system typically increases with the number of processes that are running concurrently (though in some cases not all resources scale linearly with the number of processes). To reduce process count, computations can be combined, "by hand," into a smaller number of processes, but at the sacrifice of some advantages of computation graph programming (e.g., ease of use, ease of understanding, etc.)

In data flow computation graphs implemented as communicating processes, buffering can reduce processing overhead at the cost of increasing end-to-end latency. Without buffering, latency can be reduced, but overhead will be increased, as greater operating system resources are used to move smaller amounts of data.

To alleviate this trade-off between excessive overhead and excessive latency, multiple graph components can be run as (or "folded into") a single process that performs the work of one component at a time, passing data in memory without copying or having to move the data between processes. In this approach data is pushed through a network of components within a single process.

For example, in unfolded execution, two components connected by a data flow, each executed in a separate process, communicate using a buffer. The first component stores its generated output (e.g., an accumulation of multiple output work elements) into a buffer. The first component passes the buffer to the second component using, for example, an operating system call. The second component then processes the data in that buffer. If the two processes are folded together in the same process, in "folded execution," then the folded process does not need to buffer the work elements since it controls the associated procedures that produce and accept the work elements. The folded process passes each work element produced by the procedure associated with the first component, as it is produced, to the procedure associated with the second component as an input argument: data flow is realized as control flow.

In either folded or unfolded execution, a component may have an associated degree of parallelism. In unfolded execution, a number of processes equal to a component's degree of parallelism may be created. In folded execution, connected components with the same degree of parallelism may be instantiated in the same process, resulting in the creation of a number of processes equal to the common degree of parallelism.

Folding multiple components into a single process improves performance by reducing data movement among processes and by reducing the startup time and the system-footprint of a computation graph (since there are fewer total processes running). Excessive context-switching is avoided without having to buffer data and increase latency. All of this is done without sacrificing expressibility, ease of use, and clarity of the data flow computation graph model.

Other features and advantages of the invention will become apparent from the following description, and from the claims.

DESCRIPTION

1 System Overview

Figure 1:
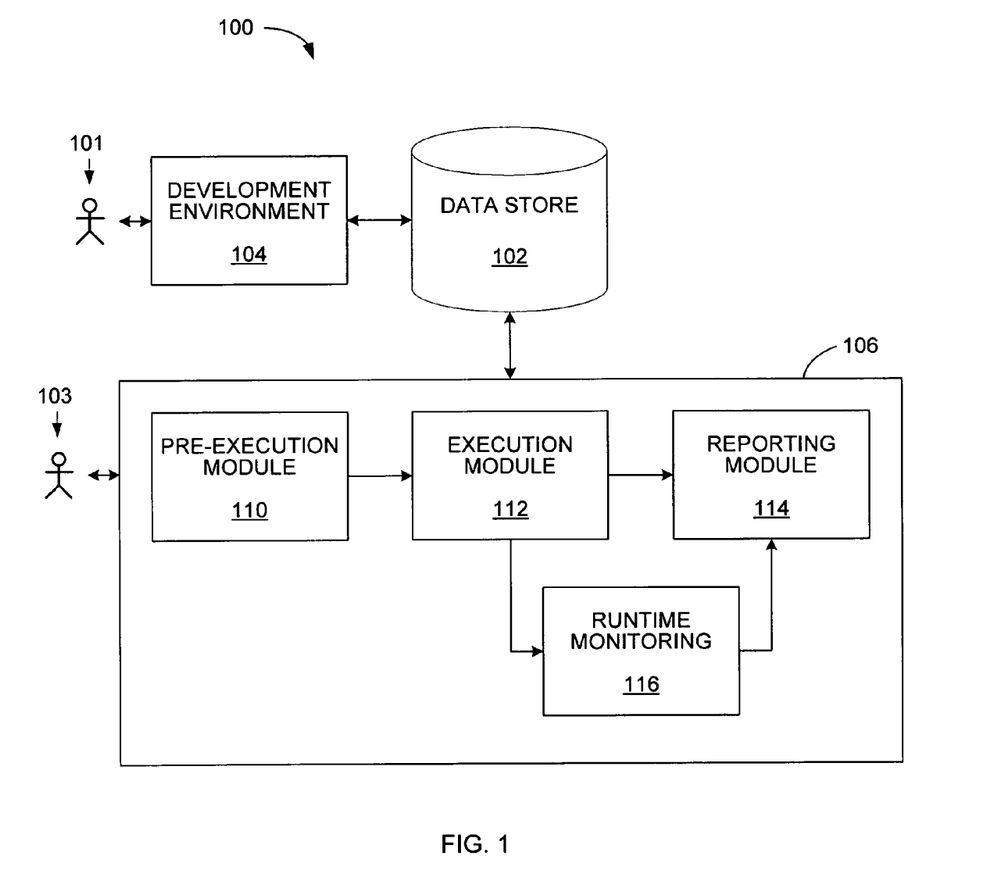
FIG. 1 is a block diagram of a system for executing graph-based computations.

Referring to FIG. 1, a system 100 for executing graph-based computations includes a development environment 104 coupled to a data store 102 and a runtime environment 106 coupled to the data store 102. A developer 101 builds applications using the development environment 102. An application is associated with one or more computation graphs specified by data structures in the data store 102 which may be written to the data store as a result of the developer's use of the development environment. A data structure specifies, for example, the vertices (components or data sets) of a computation graph and links (data flows) between the vertices. The data structures can also include various characteristics of the components, data sets, and data flows of the graphs. A data processing application, for example, may be associated with a computation graph that implements computations performed on data flowing from one or more input data sets, through a graph of processing components, to one or more output data sets.

The runtime environment 106 may be hosted on one or more general-purpose computers under the control of a suitable operating system, such as the UNIX operating system. For example, the runtime environment 106 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. The input, output or intermediate data sets that are accessed by the runtime environment 106 can be a parallel "multifile" stored in a parallel file system (e.g., the data store 102, or in an external data storage coupled to the system 100 locally or remotely over a communication link).

Concurrent execution of multiple components in a graph provides one form of parallelism. Additional parallelism can be achieved by distributing different components of a graph to different computing nodes. Elements of a graph (e.g., data sets, components, and flows) can be explicitly or implicitly replicated, to introduce the additional parallelism into the runtime environment 106.

The runtime environment 106 is configured to receive control inputs from stored scripts or input from a user 103 for executing and configuring computations. The control inputs can include commands to process particular data sets using corresponding computation graphs, which are specified in the stored graph data structures. The user 103 can interact with the runtime environment 106, for example, using a command line or graphical interface.

The runtime environment 106 includes a pre-execution module 110 to read the stored graph data structure specifying a given computation graph, and to allocate and configure computing resources such as processes for performing the computations of a component (e.g., a process or thread of execution within the host operating system). There are various approaches to assigning components to processes when executing a computation graph, as described in more detail below.

The pre-execution module 110 also allocates inter-component communication resources for implementing the data flows between components (e.g., named pipes or shared memory), and allocates storage space for work elements that arrive at in input port of a component whose process is not yet ready to accept a new work element. The resources for passing work elements over data flows between components contribute to the processing and storage overhead of the system 100. In some approaches, inter-component communication is implemented through function calls, which reduces this overhead, as described in more detail below.

The runtime environment 106 includes an execution module 112 to schedule and control execution of the processes assigned to a computation graph by the pre-execution module 110. The execution module 112 can interact with external computing resources coupled to the system 100 such as database engines, data storage, or other modules that are accessed during processing associated with the graph components.

After execution of a computation graph, or at predetermined intervals during execution, a reporting module 114 provides information characterizing a given computation, such as statistics associated with the individual components of the computation graph. Some of the information reported by the reporting module 114 is obtained from outputs generated by the computation graph. Some of the information reported is obtained by monitoring execution of the computation graph.

A runtime monitoring module (RMM) 116 monitors execution of one or more processes assigned to a computation graph and provides information to the reporting module 114. The information includes, for example, central processing unit (CPU) time devoted to running each component, or amount of data processed by each component.

2 Graph Execution

Figure 2A:
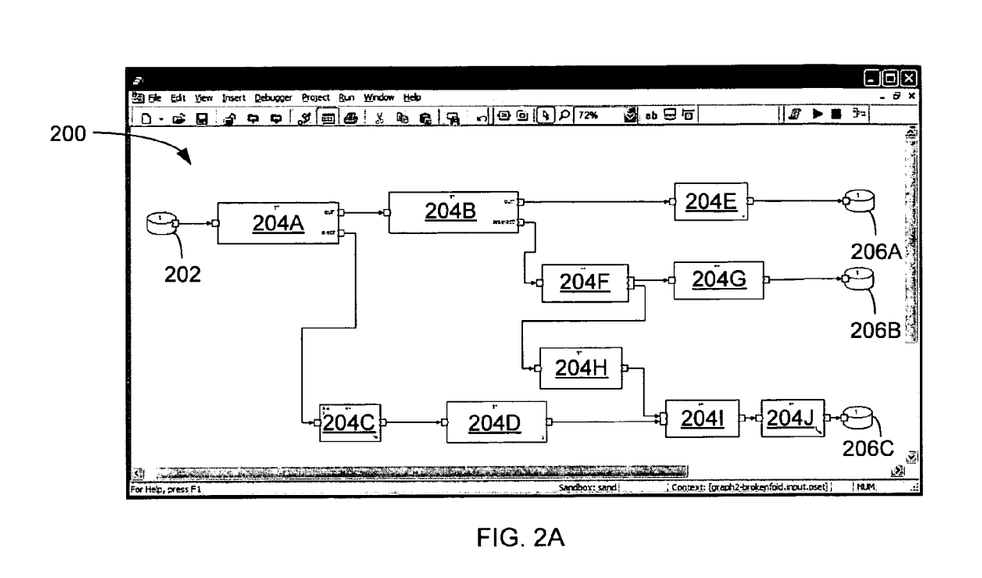
FIGS. 2A and 2B are computation graphs.

Referring to FIG. 2A, an example of a computation graph 200 includes an input data set 202 providing a series of work elements to be processed by the components 204A-204J of the computation graph 200. For example, the data set 202 can comprise data records associated with a database system or transactions associated with a transaction processing system. Each component is associated with a portion of the computation defined by the overall computation graph 200. Work elements (e.g., individual data records) enter one or more input ports of a component, and output work elements (which are in some cases the input work elements, or processed versions of the input work elements) typically leave one or more output ports of the component. In graph 200, output work elements from components 204E, 204G, and 204J are stored in output data sets 206A-206C.

In graph 200, a first filter component 204A selects a subset of work elements received over its input port to send to a second filter component 204B, and sends unselected work elements to component 204C, which feeds component 204D. The second filter component 204B selects a subset of work elements received over its input port to send to component 204E, which feeds output data set 206A. Unselected work elements from the second filter component 204B are sent to a replicate component 204F, which sends copies of each work element to a component 204G feeding output data set 206B, and to an interface component 204H. The interface component 204H provides an interface to trigger execution of an "external program" that is not fully native to the runtime environment 106. For example, this external program may be a legacy program that was written in a language not fully integrated into the runtime environment 106. The interface component 204H provides a mechanism to execute the external program as part of the computation graph 200 without requiring the external program to be recoded using a native language of the development environment. A gather component 204I combines data flows from the interface component 204H and the component 204D and sends the combined data flow of work elements to a component 204J, which feeds an output data set 206C.

2.1 Separate Processes

In a first type of approach to executing computation graphs, the pre-execution module 110 allocates separate processes for each component. For example, in a "one-process-per-component" approach, one process is allocated for each component. The process corresponding to a component handles the data access, calculation, and data transformation tasks defined by that component. The execution module 112 launches processes in the host operating system and handles tasks associated with the computation graph that are not performed by the components' processes.

When a graph component has an associated degree of parallelism, the pre-execution module 110 allocates separate processes, as many in number as the component's degree of parallelism, for different instances of the graph component. For example, a component is optionally designated (e.g., by the developer 101) as an N-way parallel component. For an N-way parallel component, each of N instances of the component is executed as a process in one of N nodes (or as a thread or other form of lightweight process in a multi-threaded processor). In these cases, there is one process or thread per instance of a parallel component.

Figure 3A:
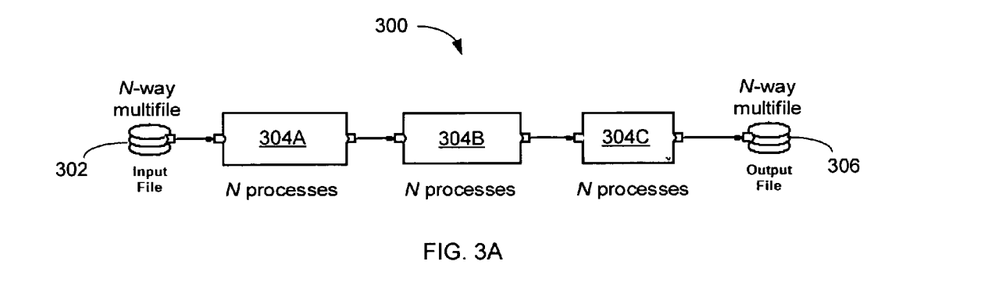
FIGS. 3A and 3B are parallel computation graphs.

Referring to FIG. 3A, a parallel graph 300 includes an input multifile 302 connected to a series of three N-way parallel components 304A, 304B and 304C, connected to an output multifile 306. In this example, the input (output) multifile is N-way parallel enabling parallel access by N processes to source (sink) N partitioned data flows. Alternatively, the input and output data sets can be serially accessed data files, or as multifiles with more or fewer than N partitions, using repartitioning components on the data flows between the input 302 and the first component 304A, and/or between the last component 304C and the output 306. When the graph 300 is executed using one process per component instance, there are 3N processes running concurrently.

The one-process-per-component or one process-per-instance approaches described above enable the system 100 to take advantage of pipeline parallelism to increase throughput of a computation graph by allowing multiple components to process data concurrently. However, the overhead associated with each process can limit system performance. For example, startup time is in some cases dominated by the time needed to start the component processes. Therefore, graphs with more components may take longer to start. Such graphs may also have a larger memory footprint limiting the number of computation graphs that can be run concurrently. A developer 101 may, in some cases, be able to reduce the number of components in a graph by consolidating logic that had been implemented in multiple components into one more complicated component. However, such manual graph manipulation may not always be possible or desirable (e.g., to maintain ease-of-use, understandability, or reusability of components).

2.2 Component Folding

In a second type of approach to executing computation graphs, the pre-execution module 110 optionally allocates some processes for executing multiple components. For example, in a "component folding" approach, the pre-execution module 110 divides the components of a graph into one or more sets each containing one or more components. Each set is assigned a different process. Thus, for components that are "folded together" into the same set, the computations represented by those components are executed by the same process. For a set with multiple components, the execution module 112 launches a "folded process" in the host operating system.

A folded process handles the data access, calculation, and data transformation tasks defined by each of the components in the set, and implements communication over links between the components in the set as function calls. The folded process calls a compute function invoking computations of a first "root" component with a given input. After the root component computations generate a result associated with an output port, the folded process calls the compute function of a linked downstream component using the result as input for the downstream component. Thus, data is pushed from a root component to downstream "interior" components in the subset. In some cases, a subset can have more than one root component supplying work elements to the interior components of the subset. This component folding approach, in addition to reducing startup latency, reduces the processing and storage overhead and latency associated with inter-component communication within subsets.

Some components, for example, those that perform reformatting or filtering, for example, on a single work element at a time are already compatible with this "push model" of execution: after a push component finishes processing a first work element, the push component is ready to process a new work element as soon as it is available at an input port. In this push model, an upstream component pushes a work element at a downstream component, the downstream component performs its computations, and then the downstream component pushes a result at its downstream component, and so on.

Other components may not be initially configured to operate according to this push model, but instead may operate according to a "pull model" of execution. An example of a pull component is a component with multiple input ports that perform computations that depend on the input port on which a work element has arrived. The component may not be ready to process a work element at a first input port because it is waiting for a work element at a second input port (e.g., a component performing a sort operation or a join operation). Other types of pull components may have a single input port. Thus, a folded process would not necessarily be able to call a compute function to operate on an input work element for a pull component.

A pull component can be recast as a push component by having it buffer all of its inputs until some logical break in the sequence of processing (for example, the end of file, or some other even that marks a boundary between units of unrelated work). In this case, the compute function for the pull component inserts each incoming record into a buffer, and, at the logical break, proceeds to process all of the input, reading from the buffers in whatever order it determines.

A folded process can use other approaches to schedule computations of the associated folded components. For example, the folded process can test state information to determine which components are ready to run.

2.2.1 Folding Constraints

The pre-execution module 110 analyzes a graph to determine which components should be folded together into the same set, optionally taking into account manual assignments of components to folded sets by the developer 101 or user 103, or other constraints on which components are to be in the same or different folded sets. The pre-execution module 110 can take into account the following constraints for determining which components are to be folded together. Some procedures can optionally omit some or all of these constraints by providing mechanisms for folded processes to handle the additional processing involved.

A first constraint depends on whether a component is designated as "foldable" or "non-foldable" (e.g., by the developer 101). A component designated as foldable includes features that can be used by a folded process to invoke the corresponding computations of that component. For example, a foldable component has a compute function that can be called by a folded process running in the runtime environment 106 to invoke computations associated with that component. An interface component that runs a legacy program may not be compatible with such a function call, and may therefore be designated as non-foldable. Other components may be designated as non-foldable due to the nature of computation being performed (e.g., the computations involve complex interactions with an external environment).

Another constraint depends on designation of phases in which different portions of a graph are to be executed. For example, a first group of upstream components are selected to run in a first phase, and after those components complete on a batch of work elements, a second group of downstream components are selected to run on that batch in a second phase. In some cases, only processes for components in a given phase run at a given time. In other cases, phases may be used to designate groups of components that are to process a given batch of work elements at a given time, though processes in different phases may be running concurrently on different batches to achieve pipeline parallelism. In either case, this constraint holds that components in a given phase should only be folded together with components in the same phase.

Figure 3B:
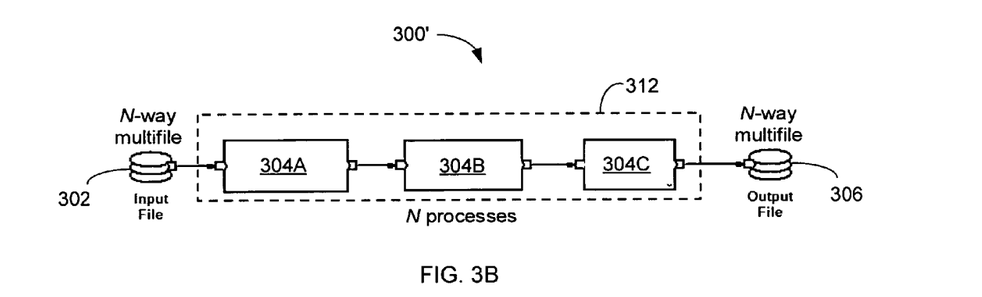

Another constraint relates to a degree of parallelism designated for the components. A component is designated as serial or as N-way parallel. As described above, for an N-way parallel component each of N instances of the component is executed in a separate process. In the component folding approach, there remain N component instances that can run in parallel, but the components instances can be folded together with other component instances. In this constraint, only components with the same degree of parallelism are folded together. Serial components are folded together with other serial components, and N-way parallel components are folded together with other N-way parallel components. For example, FIG. 3B illustrates how the parallel components in FIG. 3A are folded together. When the graph 300' is executed using component folding, there are N folded processes running concurrently. There is one folded process for each of N instances of set 312 of components.

Another related constraint is that components folded together are connected by a "straight" data flow that does not change a partitioning of the work elements represented by that data flow. For example, some data flows may repartition the N partitions of work elements flowing from an N-way parallel component into M partitions (where M≠N, or where M=N and the work elements are reshuffled among the N partitions). In this constraint, the components folded together have the same degree of parallelism, and there is no explicit or implicit repartitioning of work elements among the folded components.

In preparation for assigning components of a graph to folded sets, the pre-execution module 110 determines which foldable components in the graph are able to be root components but not interior components, and which foldable components are able to be root components or interior components. For example, some components may not be configured to have an associated compute function that can be invoked by the folded process.

The categorization of components as potential root components and/or potential interior components can occur off-line, for example, when those components are being developed. Data structures stored in the data store 102 associated with components available for building graphs can include metadata that indicates whether the component is a foldable component, or non-foldable component, and whether the component is a potential root component and/or interior component.

2.2.2 Determining Folded Sets

Figure 4:
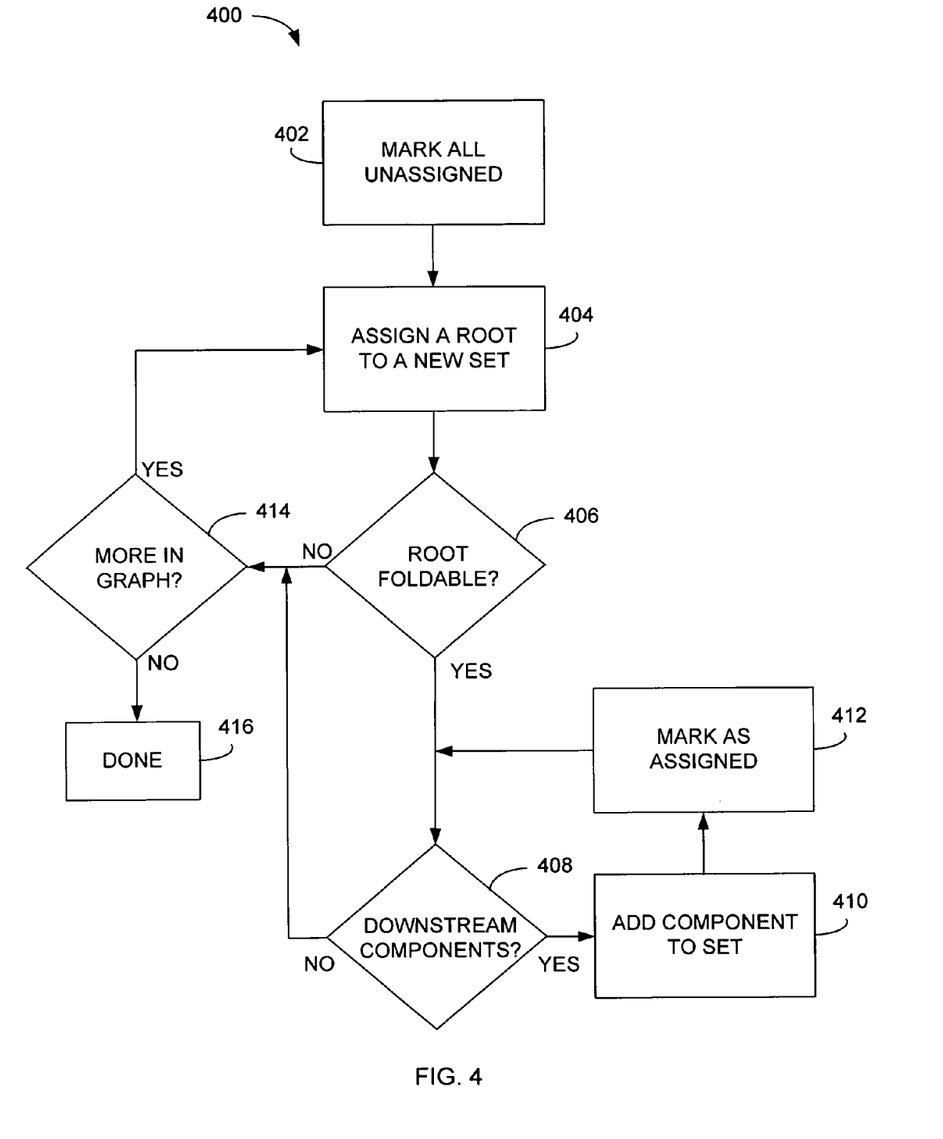
FIG. 4 is a flowchart for a procedure for assigning components to folded sets.

FIG. 4 shows a flowchart for an exemplary procedure 400 used by the pre-execution module 110 to assign components of a graph to folded sets. The procedure 400 is based on a greedy algorithm that tries to make each folded set as large as possible. The folded sets produced by this procedure 400 have a single root component providing a flow of data to one or more interior components of a connected subgraph of the graph. The folded sets are also non-overlapping. The pre-execution module 110 can perform the procedure 400, for example, well before execution time and store the results in the data store 102, or the pre-execution module 110 can perform the procedure 400 just before the graph is executed by the execution module 112. For example, the pre-execution module 110 can perform the procedure 400 at runtime before the graph is executed, but after conditional components have been removed from the graph, as described in more detail below.

The procedure 400 uses some of the folding constraints described above. A component satisfies the constraints for a folded set if the component: is foldable, has the same degree of parallelism as components in the set, is in the same phase as components in the set, and is connected to a component in the set by a straight flow.

The procedure 400 starts by marking 402 each component in the graph as "unassigned." The procedure 400 examines components in the graph based on a topological order from upstream components to downstream components (e.g., in a depth-first search order). The procedure 400 starts at a component connected to an input data set or a component without input ports and assigns 404 this component to the first set as the root. The procedure determines 406 whether the root is foldable. If the root component is foldable, the procedure 400 determines 408 whether there are any unassigned foldable components connected directly downstream of a component in the current set that satisfy the constraints. If such a component is found, the component is added 410 to the current set and marked 412 as "assigned." The procedure continues to determine 408 whether unassigned foldable components can be added. In some cases a foldable root component assigned to a set is not folded together with any other components, and is left alone in a singleton set to be executed by a process dedicated to that component.

When the current set cannot grow any bigger (e.g., remaining components connected to the set are already assigned or do not satisfy all the constraints), the procedure 400 determines 414 whether there are any unassigned components left in the graph, and if so, assigns 404 a new root component from an unassigned component connected to an input data set, or without input ports, or connected to an assigned component.

If a root component is non-foldable, the procedure 400 leaves this root component alone in its own set to be executed by a process dedicated to that component, and selects a new root component if any unassigned components remain. The procedure 400 is done 416 when no unassigned components remain.

Figure 2B:
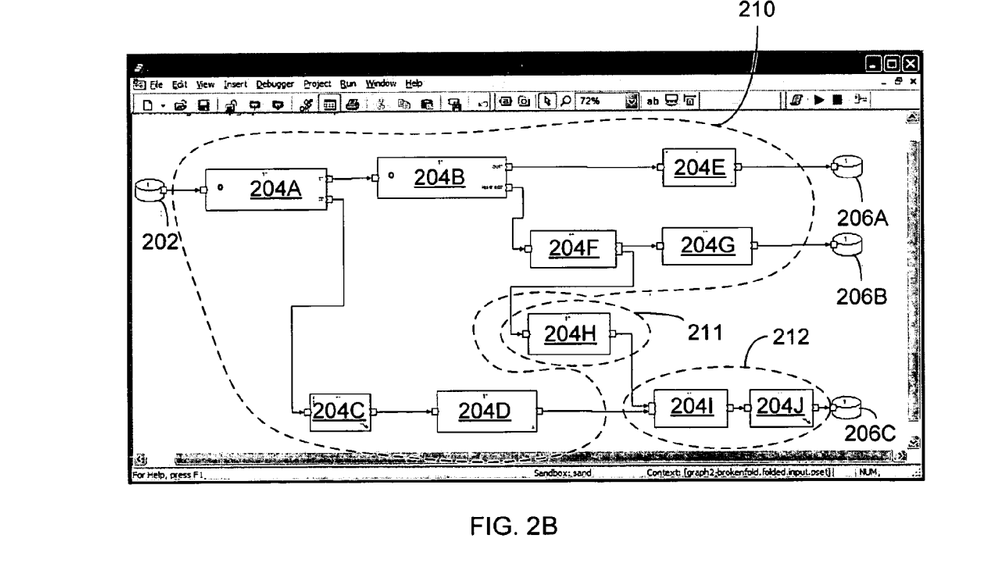

FIG. 2B shows the three folded sets identified in the graph 200 according to the procedure 400. The procedure 400 selects component 204A as the root of a set 210. The procedure 400 walks the graph in topological order adding components 204B, 204E, 204F, and 204G to the folded set 210. The component 204H is not added to the set 210 since it does not satisfy the constraint of being foldable. The procedure 400 continues to add components 204C and 204D to the folded set 210. Since no other folded sets can be added to the set 210, the procedure 400 selects a second set 211 with the non-foldable component 204H, and a third set 212 with the remaining components 204I and 204J.

In some computation graphs, a component is itself implemented as a computation graph. The procedure 400 expands such components in a graph into a subgraph within the graph. Thus, folded sets of components may span boundaries of such inserted subgraphs to include any of the "sub-components" of such a component.

In some computation graphs, a conditional components mechanism permits changes to a graph structure based on parameter values and computed metadata. A conditional component of a graph has a condition which controls whether or not that component will appear in the graph at runtime. The condition can be computed directly or indirectly through runtime parameters. Conditional components can be used to optimize or specialize graphs. Conditional components are described in more detail in U.S. patent application Ser. No. 09/627,252, filed Jul. 28, 2000, incorporated herein by reference.

After the folded sets have been identified, the pre-execution module 110 can optionally modify the graph to include elements such as buffers or adapters between folded sets.

Other procedures can be used to determine folded sets, including procedures with constraints on the topology of the subgraph of components in a folded set. For example, in some implementations, the connected subgraph of components in a folded set has a tree topology with single input interior components downstream from the root component. In some implementations, a folded process can perform actions to allow multi-input components in a folded set. For example, if a multi-input component is downstream of a root component, the folded process buffers data for the multiple inputs and only calls the compute function of the multi-input function if all buffers have data available. The folded set may have a topology such that for each multi-input component in the set, all of the upstream components connected to the inputs of that component are also in the set.

2.2.3 Executing Folded Processes

The execution module 112 starts folded processes corresponding to the folded sets identified by the pre-execution module 110. The pre-execution module 110 provides to the execution module 112 information identifying the components in each folded set and the data flows connecting those components. The execution module 112 generates runtime data structures including pointers to component objects in the data store 102, and assigns storage space for storing work elements to be communicated between components in a folded set. The amount of storage space allocated and time devoted to moving work element data between components can be kept low since a folded process can access the same storage space while performing computations for different components.

For example, the folded process communicates data from an upstream component to a downstream component using storage space allocated to store work elements corresponding to a data flow. A compute function for a component is able to access the work elements by reading a data pointer variable that points to the appropriate location in the storage space.

The compute function of an upstream component ensures that the storage space corresponding to the data pointer variable for the downstream component contains the data to be processed. In some cases, this involves the upstream component simply writing data into the storage space that will be accessed by the downstream component. However, for components that do not change their input data (e.g., a filter component), the data may already be stored in an accessible location and the data does not need to be moved, but can be ready by providing an appropriate data pointer variable.

Each folded processes invokes computations corresponding to the components by repeatedly calling compute functions according to a sequence defined by the data flows connecting the components in the folded set. The upstream component calls the downstream component's compute function. The compute function performs computations associated with the component. For example, the computation may involve updating state variables associated with the component, transforming stored work elements, generating new work elements, or communicating data downstream by ensuring output data is stored in the appropriate storage space. When the compute function returns control to the folded process, the associated component is considered to have processed the data associated with its data pointer variable.

A root component is the point at which data is supplied to a folded set. In many cases, this is done by reading data from an input stream or a file, or by extracting data from an external system such as a database or a queue. In some cases, the data is generated by the root component. The compute function of a root component does not push an arbitrarily large amount of data through the folded set without returning control to the folded process. For example, the compute function of a root component returns control to the folded process at predetermined intervals with one of the following codes:

KEEP_GOING: This code indicates that there is more data to be supplied. The folded process responds by calling compute function again.

ERROR: This code indicates that an error has occurred. A global "error status" variable accessible to the folded process contains a detailed error message. The folded process responds by displaying the error message and aborting, for example.

REACHED_EOF: This code indicates that there is no more data to be supplied. The folded process responds by shutting down the folded set, as described in more detail below.

GOT_BLIP: This code indicates that a control message (blip) was received (e.g., a checkpoint message in a continuous flow of work elements). A global "blip" variable accessible to the folded process contains the control message. The folded process responds by processing the control message and, once it has been processed, calling the compute function again.

When the root component returns REACHED_EOF, the folded process shuts down the folded set. This is done by calling a shutdown function associated with each of the components in the folded set, in topologically sorted order, from upstream components to downstream components.

The shutdown function may produce data that is pushed downstream. For example, the compute function for a hash rollup component builds up a data in various accumulators and does not produce output data until the shutdown function is called.

When the root component returns GOT_BLIP, the folded process propagates the blip downstream. This is done by calling a process blip function associated with each of the components in the folded set. As with the shutdown function, the process blip function may trigger further computation. For example, a continuous flow rollup component does not push data downstream until its process blip function is called.

A blip may direct the components in a graph to checkpoint their state, for example, as described in U.S. Pat. No. 6,584,581, entitled CONTINUOUS FLOW CHECKPOINTING DATA PROCESSING, incorporated herein by reference. In that case, the process blip function is responsible for storing current state information to a checkpoint file in non-volatile storage. The components in a folded set can (e.g., for efficiency reasons) share a checkpoint file. If a shared checkpoint file is employed, then all components within a folded set complete their checkpoint before the checkpoint blip is propagated to any components outside of the folded set. This can be accomplished, for example, either by invoking the components' process blip functions in topologically sorted order, from upstream components to downstream components, or by propagating blips to components outside of the folded set in a separate pass, after checkpointing is completed.

The execution model can be extended to incorporate components whose compute function involves interaction with external facilities, including, for example, databases or web servers.

Interactions with external facilities can, in general, take relatively large and/or unbounded amounts of time, effectively limiting throughput of an application. One strategy to improve throughput in one-process-per-component execution is to open a set (or pool) of connections to a facility, issuing requests on an available connection as input records are received by a component. The component captures the responses as they are returned, asynchronously, from the facility, and generates output records as appropriate. This approach may not be compatible with some implementations of folded execution, however, because the compute function for such a component receives one input record at a time, and generates a corresponding output record for that input record before the component returns.

To take advantage of pooled connections and asynchronous result capture in folded execution, components making such requests are effectively broken into two components: a first component that accepts input records and issues requests, and a second component that receives responses and constructs output records. The second component is then treated as an additional "root" to the set of folded components being executed by a single process, and responses from the corresponding external facility are treated as inputs to the second component. The process executing the folded set then waits for input from any source—an input to its original root component or a response from an external facility—and invokes the compute function on the appropriate root component.

In either unfolded or folded execution, if the order of results from a component connecting to a remote facility needs to correspond to the order of inputs, then results may be accumulated and reordered before they are passed on to downstream components.

3 Monitoring

The RMM 116 provides information about execution of a graph to the developer 101 and/or user 103. The RMM 116 provides information about runtime characteristics of individual components of the graph even if those components were folded together during execution. Thus, characteristics of computations associated with components of the graph can be analyzed according to the logical structure of the graph, without requiring the number of processes performing the computations to match the number of components in the graph. For example, the RMM 116 can present approximately the same runtime characteristics for a graph executed using a component folding approach, or using one-process-per-component approach.

For folded sets with only one component, and in the one-process-per-component approach, the RMM 116 tracks characteristics such as CPU time based on the process corresponding to a component, and RMM 116 tracks the amount of data processed based on the data communication channel supporting a data flow into or out of the component.

For folded sets with more than one component, the RMM 116 tracks the CPU time for the folded process, and amount of data processed for the folded set, and breaks down these totals on a component-by-component basis. A simple approach would be to divide the total amount by the number of components in the folded set. However, in many cases, a more accurate break down of the monitored quantities is desired.

A folded process writes tracking information into stored variables in a way that corresponds to the components and data flows represented within the corresponding folded set. For example, each time the data pointer variable corresponding to a data flow into (or out of) a component is read (or written), corresponding record-count and byte-count tracking values are incremented.

The RMM 116 can achieve a more accurate breakdown of CPU time using an interrupt approach. A timer triggers an interrupt to sample the proportion of time a folded process spends calling functions associated with the various components in a folded set. As each function is called, for example, the function writes in a global variable that a corresponding component is "active." When the timer goes off, an interrupt is triggered and the folded process increments a counter associated with the active component. To report CPU time for each component in a folded set, the total time for the folded set is divided proportionally according to those counts.

Another approach for achieving an accurate breakdown of CPU time is to time the invocation of each folded component's compute and process_blip functions. Since timing every invocation could introduce unacceptable overhead, the system can time a fraction of the invocations (for example, each of the first 100, and then every $1000^{th}$ thereafter). The collected times can then be used to divide overall CPU time for the process proportionally among the folded components.

The component folding approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. It is to be understood that the foregoing description is intended to illustrate and not to limit the scope of the invention, which is defined by the scope of the appended claims. Other embodiments are within the scope of the following claims.

What is claimed is:

1. A method for executing graph-based computations using a computer system that provides computing resources that can be assigned to data processing elements and used to perform computations, the method including:
   accepting a specification of a computation graph in which data processing elements are joined by linking elements, wherein each of the linking elements is associated with a data flow from an output of an upstream data processing element to an input of a downstream data processing element;
   dividing the data processing elements into sets of data processing elements, at least a first set of data processing elements including multiple of the data processing elements forming a connected directed subgraph of the computation graph;
   assigning to each set of data processing elements a different computing resource of the computer system; and
   processing data according to the computation graph, including
      performing computations corresponding to the data processing elements using the assigned computing resources, wherein one of the computing resources, which is assigned to the first set of data processing elements, passes work elements associated with a data flow resulting from an output of a first upstream data processing element to an input of a downstream data processing element by calling a function associated with the downstream data processing element, wherein the first upstream data processing element and the downstream data processing element are in the first set of data processing elements, and
      in response to receiving a control message for a data processing element in the first set that does not have an upstream data processing element in the first set, propagating the control message to each of the other data processing elements in the fist set.

2. The method of claim 1, wherein at least one of the computing resources assigned to a set of data processing elements includes a process.

3. The method of claim 1, wherein processing the data includes, for at least one of the sets of data processing elements, performing computations corresponding to the data processing elements in the set of data processing elements according to a sequence defined by the linking elements joining the data processing elements in the set of data processing elements.

4. The method of claim 1, wherein the function associated with the downstream data processing element reads the work elements from a storage location in which the work elements were written by a function associated with the upstream data processing element.

5. The method of claim 4, wherein a process which invokes the function associated with the upstream data processing element is the process which invokes the function associated with the downstream data processing element.

6. The method of claim 1, wherein the subgraph includes a tree.

7. The method of claim 1, wherein for any data processing element in a set of data processing elements that has multiple inputs, all of the upstream data processing elements linked to the inputs of that data processing element are also in the set of data processing elements.

8. The method of claim 1, where propagating the control message to each of the other data processing elements in the first set includes calling functions associated with each of the other data processing elements in the first set to save state information, for each data processing element in the first set, in non-volatile storage before propagating the control message outside of the first set.

9. The method of claim 8, wherein the state information for each of the data processing elements in the first set is saved in a single file.

10. The method of claim 1, wherein each of the data processing elements have a specified degree of parallelism.

11. The method of claim 10, wherein all of the data processing elements in a set of data processing elements have the same degree of parallelism.

12. The method of claim 1, wherein the specification of the computation graph indicates a phase of execution associated with each of the data processing elements.

13. The method of claim 12, wherein each of the data processing elements in a set of data processing elements are associated with the same phase of execution.

14. The method of claim 1, wherein one of the computing resources passes work elements associated with a data flow resulting from an output of a second upstream data processing element to the input of the downstream data processing element by calling a function associated with the downstream data processing element.

15. The method of claim 14, wherein one of the computing resources simultaneously passes work elements associated with the data flow resulting from the output of the first upstream data processing element and work elements associated with the data flow resulting from the output of the second upstream data processing element.

16. The method of claim 1, wherein the work elements, which are passed to the input of the downstream data processing element, are a selected subset of a total number of work elements to be passed.

17. The method of claim 16, wherein work elements not in the selected subset are passed to a second downstream data processing element.

18. The method of claim 1, wherein each data processing element that is in a set of data processing elements is in only one set of data processing elements.

19. The method of claim 1, wherein the function associated with the downstream data processing element is a compute function, the compute function performing computations associated with the downstream data processing element.

20. The method of claim 19, wherein the computations include at least one of updating state variables associated with the data processing element, transforming stored work elements, generating new work elements, or communicating data to a further downstream data processing element.

21. The method of claim 1, further including:
tracking quantities of activity associated with each data processing element in each set of data processing elements.

22. The method of claim 21, wherein the respective quantities of activity include quantities of data processed according to the respective data processing elements.

23. The method of claim 21, wherein the respective quantities of activity include amounts of time spent by the computing resource assigned to a set of data processing elements performing computations corresponding to the respective data processing elements.

24. A computer program, stored on a computer-readable storage medium, for executing graph-based computations, the computer program including instructions for causing a computer system to:
accept a specification of a computation graph in which data processing elements are joined by linking elements, wherein each of the linking elements is associated with a data flow from an output of an upstream data processing element to an input of a downstream data processing element;
divide the data processing elements into sets of data processing elements, at least a first set of data processing elements including multiple of the data processing elements forming a connected directed subgraph of the computation graph;
assign to each set of data processing elements a different computing resource; and
process data according to the computation graph, including
performing computations corresponding to the data processing elements using the assigned computing resources, wherein one of the computing resources, which is assigned to the first set of data processing elements, passes work elements associated with a data flow resulting from an output of a first upstream data processing element to an input of a downstream data processing element by calling a function associated with the downstream data processing element, wherein the first upstream data processing element and downstream data processing element are in the first set of data processing elements, and
in response to receiving a control message for a data processing element in the first set that does not have an upstream data processing element in the first set, propagate the control message to each of the other data processing elements in the first set.

25. The computer program of claim 24, wherein at least one of the computing resources assigned to a set of data processing elements includes a process.

26. The computer program of claim 24, wherein processing data further includes maintaining information characterizing respective quantities of activity associated with each data processing element in each set of data processing elements.

27. The computer program of claim 24, wherein processing the data includes, for at least one of the sets of data processing elements, performing computations corresponding to the data processing elements in the set of data processing elements according to a sequence defined by the linking elements joining the data processing elements in the set of data processing elements.

28. The computer program of claim 24, wherein the function associated with the downstream data processing element reads the work elements from a storage location in which the work elements were written by a function associated with the upstream data processing element.

29. The computer program of claim 28, wherein a process which invokes the function associated with the upstream data processing element is the process which invokes the function associated with the downstream data processing element.

30. The computer program of claim 24, wherein for any data processing element in a set of data processing elements that has multiple inputs, all of the upstream data processing elements linked to the inputs of that data processing element are also in the set of data processing elements.

31. The computer program of claim 24, where propagating the control message to each of the other data processing elements in the first set includes calling functions associated with each of the other data processing elements in the first set to save state information, for each data processing element in the first set, in non-volatile storage before propagating the control message outside of the first set.

32. The computer program of claim 24, wherein each of the data processing elements have a specified degree of parallelism.

33. The computer program of claim 32, wherein all of the data processing elements in a set of data processing elements have the same degree of parallelism.

34. The computer program of claim 24, wherein the specification of the computation graph indicates a phase of execution associated with each of the data processing elements.

35. The computer program of claim 34, wherein each of the data processing elements in a set of data processing elements are associated with the same phase of execution.

36. A system for executing graph-based computations, the system including:
a pre-execution module including circuitry to
accept a specification, stored in a data storage system, of a computation graph in which data processing elements are joined by linking elements, wherein each of the linking elements is associated with a data flow from an output of an upstream data processing element to an input of a downstream data processing element, and
divide the data processing elements into sets of data processing elements, at least a first set of data processing elements including multiple of the data processing elements forming a connected directed subgraph of the computation graph; and
an execution module including circuitry to
assign to each set of data processing elements a different computing resource, and
process data, by at least one processor, according to the computation graph, including
performing computations corresponding to the data processing elements using the assigned computing resources, wherein one of the computing resources, which is assigned to the first set of data processing elements, passes work elements associated with a data flow resulting from an output of a first upstream data processing element to an input of a downstream data processing element by calling a function associated with the downstream data processing element, wherein the first upstream data processing element and the downstream data processing element are in the first set of data processing elements, and
in response to receiving a control message for a data processing element in the first set that does not have an upstream data processing element in the first set, propagate the control message to each of the other data processing elements in the first set.

37. The system of claim 36, wherein at least one of the computing resources assigned to a set of data processing elements includes a process.

38. The system of claim 36, further including a runtime monitoring module including circuitry to maintain information characterizing respective quantities of activity associated with each data processing element in each set of data processing elements.

39. The system of claim 36, wherein processing the data includes, for at least one of the sets of data processing elements, performing computations corresponding to the data processing elements in the set of data processing elements according to a sequence defined by the linking elements joining the data processing elements in the set of data processing elements.

40. The system of claim 36, wherein the function associated with the downstream data processing element reads the work elements from a storage location in which the work elements were written by a function associated with the upstream data processing element.

41. The system of claim 40, wherein a process which invokes the function associated with the upstream data processing element is the process which invokes the function associated with the downstream data processing element.

42. The system of claim 36, wherein for any data processing element in a set of data processing elements that has multiple inputs, all of the upstream data processing elements linked to the inputs of that data processing element are also in the set of data processing elements.

43. The system of claim 36, where propagating the control message to each of the other data processing elements in the first set includes calling functions associated with each of the other data processing elements in the first set to save state information, for each data processing element in the first set, in non-volatile storage before propagating the control message outside of the first set.

44. The system of claim 36, wherein each of the data processing elements have a specified degree of parallelism.

45. The system of claim 44, wherein all of the data processing elements in a set of data processing elements have the same degree of parallelism.

46. The system of claim 36, wherein the specification of the computation graph indicates a phase of execution associated with each of the data processing elements.

47. The system of claim 46, wherein each of the data processing elements in a set of data processing elements are associated with the same phase of execution.

48. A system for executing graph-based computations, the system including:
means for accepting a specification, stored in a data storage system, of a computation graph in which data processing elements are joined by linking elements, wherein each of the linking elements is associated with a data flow from an output of an upstream data processing element to an input of a downstream data processing element;
means for dividing the data processing elements into sets of data processing elements, at least a first set of data processing elements including multiple of the data processing elements forming a connected directed subgraph of the computation graph;
means for assigning to each set of data processing elements a different computing resource; and
means for processing data, by at least one processor, according to the computation graph, including
performing computations corresponding to the data processing elements using the assigned computing resources, wherein one of the computing resources, which is assigned to the first set of data processing elements, passes work elements associated with a data flow resulting from an output of a first upstream data processing element to an input of a downstream data processing element by calling a function associated with the downstream data processing element, wherein the first upstream data processing element and the downstream data processing element are in the first set of data processing elements, and in response to receiving a control message for a data processing element in the first set that does not have an upstream data processing element in the first set, propagating the control message to each of the other data processing elements in the first set.

49. The system of claim 48, wherein at least one of the computing resources assigned to a set of data processing elements includes a process.

50. The system of claim 48, further including means for maintaining information characterizing respective quantities of activity associated with each data processing element in each set of data processing elements.

51. The system of claim 48, wherein processing the data includes, for at least one of the sets of data processing elements, performing computations corresponding to the data processing elements in the set of data processing elements according to a sequence defined by the linking elements joining the data processing elements in the set of data processing elements.

52. The system of claim 48, wherein the function associated with the downstream data processing element reads the work elements from a storage location in which the work elements were written by a function associated with the upstream data processing element.

53. The system of claim 52, wherein a process which invokes the function associated with the upstream data processing element is the process which invokes the function associated with the downstream data processing element.

54. The system of claim 48, wherein for any data processing element in a set of data processing elements that has multiple inputs, all of the upstream data processing elements linked to the inputs of that data processing element are also in the set of data processing elements.

55. The system of claim 48, where propagating the control message to each of the other data processing elements in the first set includes calling functions associated with each of the other data processing elements in the first set to save state information, for each data processing element in the first set, in non-volatile storage before propagating the control message outside of the first set.

56. The system of claim 48, wherein each of the data processing elements have a specified degree of parallelism.

57. The system of claim 56, wherein all of the data processing elements in a set of data processing elements have the same degree of parallelism.

58. The system of claim 48, wherein the specification of the computation graph indicates a phase of execution associated with each of the data processing elements.

59. The system of claim 58, wherein each of the data processing elements in a set of data processing elements are associated with the same phase of execution.

60. A method for executing graph-based computations using a computer system that provides computing resources that can be assigned to data processing elements and used to perform computations, the method including:

accepting a specification of a computation graph in which data processing elements are joined by linking elements, wherein each of the linking elements is associated with a data flow from an output of an upstream data processing element to an input of a downstream data processing element;

determining whether each data processing element is foldable or non-foldable, where all foldable data processing elements include a computer interface used to invoke the corresponding computations of the foldable data processing element and all non-foldable data processing elements do not include a computer interface used to invoke the corresponding computations of the non-foldable data processing element;

dividing the foldable data processing elements into one or more sets of data processing elements, at least one of the sets of data processing elements including multiple of the foldable data processing elements;

assigning to each set of data processing elements a different computing resource of the computer system; and processing data according to the computation graph, including performing computations corresponding to the data processing elements using the assigned computing resources, wherein one of the computing resources, which is assigned to one of the sets of data processing elements, passes work elements associated with a data flow resulting from an output of a first foldable upstream data processing element to an input of a downstream foldable data processing element by calling a function associated with the foldable downstream data processing element, wherein the first foldable upstream data processing element and the foldable downstream data processing element are in the same set of data processing elements.

61. The method of claim 60, further comprising analyzing the computation graph to determine which data processing elements should be divided into the same set of data processing elements using constraints based on characteristics of the data processing elements.

62. The method of claim 61, wherein the constraints include a constraint of which data processing elements are foldable and which data processing elements are non-foldable.

63. The method of claim 61, wherein the pre-execution module analyzes the computation graph to determine which data processing elements should be divided into the same set of data processing elements before the graph-based computations are executed.

64. The method of claim 61, wherein determining each set of data processing elements includes determining a foldable root data processing element, and determining additional data processing elements in the set such that any foldable data processing element directly downstream from any foldable data processing element already in the set is also in the set.

65. The method of claim 60, further including determining at least one data processing element is foldable and at least one data processing element is non-foldable.

66. The method of claim 60, wherein at least one of the computing resources assigned to a set of data processing elements includes a process.

67. The method of claim 60, further including maintaining information characterizing respective quantities of activity associated with each data processing element in each set of data processing elements.

68. The method of claim 60, wherein processing the data includes, for at least one of the sets of data processing elements, performing computations corresponding to the data processing elements in the set of data processing elements according to a sequence defined by the linking elements joining the data processing elements in the set of data processing elements.

69. The method of claim 60, wherein the function associated with the downstream data processing element reads the work elements from a storage location in which the work elements were written by a function associated with the upstream data processing element.

70. The method of claim 69, wherein a process which invokes the function associated with the upstream data processing element is the process which invokes the function associated with the downstream data processing element.

71. The method of claim 60, wherein for any data processing element in a set of data processing elements that has multiple inputs, all of the upstream data processing elements linked to the inputs of that data processing element are also in the set of data processing elements.

72. The method of claim 60, wherein each of the data processing elements have a specified degree of parallelism.

73. The method of claim 72, wherein all of the data processing elements in a set of data processing elements have the same degree of parallelism.

74. The method of claim 60, wherein the specification of the computation graph indicates a phase of execution associated with each of the data processing elements.

75. The method of claim 74, wherein each of the data processing elements in a set of data processing elements are associated with the same phase of execution.

* * * * *

UNITED STATES PATENT AND TRADEMARK OFFICE
CERTIFICATE OF CORRECTION

| | | |
|---|---|---|
| PATENT NO. | : 7,870,556 B2 | Page 1 of 1 |
| APPLICATION NO. | : 11/434623 | |
| DATED | : January 11, 2011 | |
| INVENTOR(S) | : Joseph Skeffington Wholey, III, Igor Sherb and Ephraim Meriwether Vishniac | |

It is certified that error appears in the above-identified patent and that said Letters Patent is hereby corrected as shown below:

On the Title Page, Item (56) (U.S. Patent Documents), Line 7, Delete "6,611,682" and insert -- 6,611,862 --

Signed and Sealed this
Twenty-second Day of March, 2011

David J. Kappos
*Director of the United States Patent and Trademark Office*